…

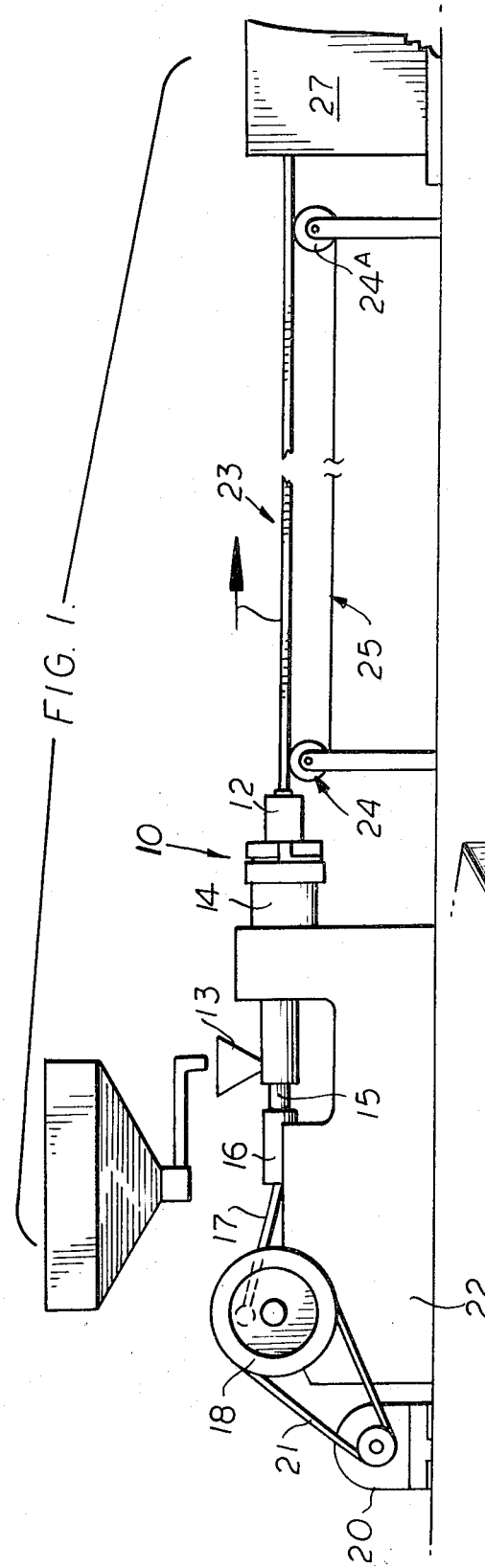
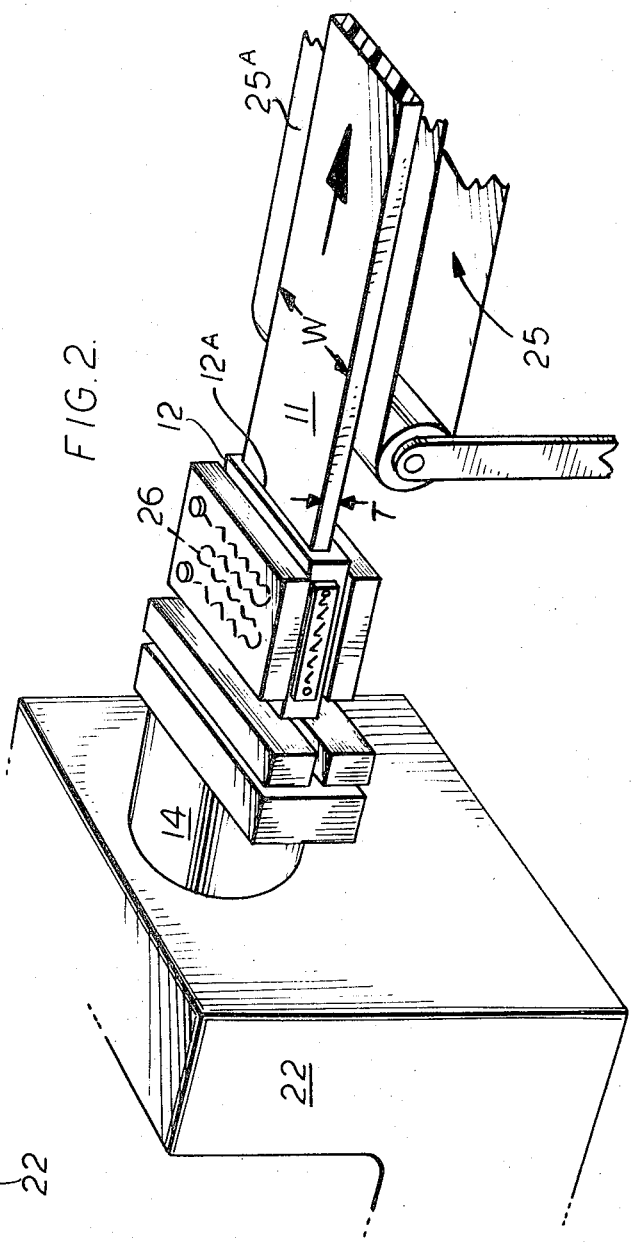
FIG. 1.
FIG. 2.
INVENTOR
GUY E. CARROW
BY: Pendleton, Neuman
Seibold & Williams
ATTY'S

United States Patent Office 3,632,702
Patented Jan. 4, 1972

3,632,702
METHOD FOR FORMING A THICK THERMOPLASTIC SLAB
Guy E. Carrow, Bartlesville, Okla., assignor to Phillips Petroleum Company
Filed Nov. 22, 1968, Ser. No. 778,124
Int. Cl. B29c *17/14, 25/00;* B29f *3/00*
U.S. Cl. 264—40               3 Claims

ABSTRACT OF THE DISCLOSURE

A method for forming a thick thermoplastic slab is provided wherein the slab is extruded at a predetermined speed of at least 6″ per minute and the slab extrudate temperature, when discharged from the extrusion die, is at least approximately 300° F. The slab extrudate, upon being discharged, is supported in a substantially horizontal plane and, while so supported, is conveyed away from the extrusion die at approximately the same speed as the speed of discharge of the extrudate from the die.

BACKGROUND OF THE INVENTION

Heretofore, thick thermoplastic slabs have been formed by various extrusion processes; however, such slabs have exhibited molded in or internal stresses which became apparent by warpage after cooling or by severe distortion when the slabs were cut either transversely or lengthwise into predetermined sizes. By reason of such warpage or distortion, the utility of the slab was materially reduced. Furthermore, the prior extrusion processes normally required the slab extrudate to be cooled substantially prior to being discharged from the forming die and thus, the extrusion speeds were extremely slow (e.g., 2″/minute). As a result, therefore, the cost of production was higher.

SUMMARY OF THE INVENTION

Thus, it is an object of this invention to provide a method of producing thick thermoplastic slabs which avoids the shortcomings that have beset prior production methods.

It is a further object of this invention to provide a method which permits thick thermoplastic slabs to be produced in a continuous expeditious manner without the slabs being possessed of undesirable characteristics.

It is a further object of this invention to provide an apparatus which is of simple construction and is readily capable of being modified to form slabs which vary over a wide range in thicknesses of profile.

Further and additional objects will appear from the description, accompanying drawings and appended claims.

In accordance with one embodiment of this invention an apparatus for forming a thick thermoplastic slab is provided which includes a long land die and means for causing a plastic melt to pass therethrough and be discharged therefrom at a predetermined speed. The die includes means for maintaining the slab extrudate at the time of discharge at a temperature of at least approximately 300° F. Upon the discharge of the slab extrudate, the latter engages a support whereupon it is automatically conveyed away from the die at a speed approximating the said predetermined speed of discharge. The slab extrudate, while being conveyed away from the die, is supported in a substantially horizontal plane and is subjected to air cooling.

DESCRIPTION

For a more complete understanding of the invention, reference should be made to the drawings wherein:

FIG. 1 is a fragmentary side elevational view of one form of the apparatus in question, shown in partially diagrammatic fashion.

FIG. 2 is a fragmentary perspective view taken from above of the form of apparatus shown in FIG. 1.

Referring now to the drawing and more particularly to FIG. 1, an extrusion apparatus 10 is shown which is adapted to form a thick thermoplastic slab 11, see FIG. 2. By way of example, the slab 11 may be formed of a polyethylene material, such as that available on the market under the designation of Phillips M–407. Such a material has a density of .941 gram per cubic centimeter and a melt index of 1.5. Other available types of suitable materials may be used, if desired, and the particular material to be utilized will depend upon the ultimate use of the formed product. The thickness of profile of the slab will be limited only by the capacity of the extruder and the geometry of the die. Generally the thickness may be between ¼ inch to 6 inches and the width may be as much as 6 feet or even wider. The expression "thickness of profile" as used herein relates to the thickness T and width W of the slab extrudate, see FIG. 2. The length of the ultimate slab will be determined by a cutter, not shown, which is located downstream of the apparatus 10.

Apparatus 10 in the illustrated embodiment includes in this instance a long land die 12, a feed hopper 13, a plasticizing and flow control means 14, a plunger 15 which is attached to a cross head 16, a connecting rod 17, and a fly wheel 18, driven by a motor 20 through a belt 21. All or substantially all of the aforenoted components of the apparatus are mounted on an upright base 22.

Positioned adjacent to and aligned with the discharge side of die 12 is a horizontally disposed conveyor 23 onto which the slab extrudate 11 is fed at a predetermined speed. Where the thickness of profile of the slab extrudate is 1″ x 5″ or 1″ x 7″ and the temperature of substantially the entire slab extrudate 11 upon leaving the die 12 is between 300–400° F., the extrusion rate (discharge speed) is at least 6 inches/minute. The conveyor 23 is provided with at least a pair of sprockets or rollers 24, one of said sprockets or rollers 24a being power driven. Cooperating with the sprockets or rollers 24 is an endless chain or metal cloth belt 25. The upper run 25a of the conveyor belt is aligned with the die opening 12a so that the slab extrudate 11 is supported in a horizontal plane when it is subtended and engaged by the belt upper run 25a. The conveyor belt 25 is driven by sprocket or roller 24a, so that the upper run 25a is moving away from the die opening 12a at substantially the same speed as the extrusion rate (e.g., 6 inches/minute).

The long land die 12 in this instance is of a type wherein the passage length is relatively large as compared with the profile thickness T. In general, with a die of this type, the length thereof is in a range of 10 to 100 times the thickness T. Where the T dimension is approximately one inch (1″) and the W dimension is from five to seven inches (5–7″), the preferred ratio of the length of the land in the die to the thickness T is 18 to 1. If the thickness of profile as determined by the die opening 12a is to be changed, an end plate having a different shape die opening may be substituted for the end plate shown in the illustrated die 12.

As seen in FIG. 2, the die 12 is provided with heating means 26 which may be electrically energized, if desired, so as to cause the plastic granules fed from hopper 13 into the plasticizing and flow control means 14 to attain the desired molten state as they are forced through the die 12. The heating means 26 is adjusted so as to produce a smooth temperature gradient from a temperature at the input side of the die which is above the melt temperature of the material being extruded to a temperature between 300–400° F. wherein the material has solidified sufficiently so that it will retain its shape while being moved on the conveyor. The temperature gradient affected in the die will depend upon the characteristics of the material being extruded and the ultimate shape of the extrudate.

Subsequent to the slab extrudate 11 being deposited upon the belt run 25a, it is preferably passed through an air cooling tunnel 27, see FIG. 1, which is located downstream from the die 12. After the extrudate has been cooled a sufficient amount, it then passes beneath the cutter, not shown, wherein slabs of the desired shape are formed, which are substantially free of undesirable internal or molded in stresses that might otherwise cause warpage or severe distortion.

Thus, it will be seen that a method for forming thick thermoplastic slabs has been provided wherein the slabs may be expeditiously and inexpensively produced without their being possessed of internal or molded in stresses which cause warpage or severe distortion.

While a particular embodiment of the invention has heretofore been described, it is to be understood, of course, that the invention is not limited thereto, but further modifications are contemplated and it is intended by the appended claims to cover such modifications.

I claim:

1. A method of forming from polyethylene an elongated thick slab of uniform cross-sectional configuration and free of stresses causing warpage or distortion when the slab is cut to a predetermined size, said method comprising forcing a melt of said polyethylene through a long land extrusion die at a temperature of at least about 300° F., discharging the slab extrudate of polyethylene therefrom at a speed of at least 6″ per minute, controlling the heat of said melt while passing through said die whereby the temperature of substantially the entire slab extrudate upon discharge is at least approximately 300° F., supporting the discharge slab extrudate in a substantially horizontal plane and while so supported conveying the slab extrudate away from the die at a speed substantially equal to the speed of discharge of the slab extrudate from said extrusion die.

2. The method of claim 1 wherein the slab extrudate is polyethylene and has a profile of at least approximately 1″ x 5″ and the speed of discharge of said slab extrudate is at least approximately 6″ per minute.

3. The method of claim 1 including air cooling of the slab extrudate while being conveyed away from the die.

References Cited

UNITED STATES PATENTS

| | | | |
|---|---|---|---|
| 3,068,513 | 12/1962 | Chaffin | 264—176 |
| 3,239,881 | 3/1966 | Larsen | 264—176 |
| 3,309,436 | 3/1967 | Larsen | 264—176 |
| 3,507,939 | 4/1970 | Williams et al. | 264—176 |

FOREIGN PATENTS

| | | | |
|---|---|---|---|
| 1,048,287 | 11/1966 | Great Britain | 264—176 |

ROBERT F. WHITE, Primary Examiner

J. R. THURLOW, Assistant Examiner

U.S. Cl. X.R.

18—12 DS; 264—148, 177, 237